(12) United States Patent
Courbon

(10) Patent No.: US 7,878,477 B2
(45) Date of Patent: Feb. 1, 2011

(54) MULTI-AXIS PIVOTING DETENT JOINT ASSEMBLY FOR AN EXTERIOR VEHICLE MIRROR

(75) Inventor: Emmanuel Courbon, Columbia, SC (US)

(73) Assignee: Lang-Mekra North America, LLC, Ridgeway, SC (US)

(*) Notice: Subject to any disclaimer, the term of this patent is extended or adjusted under 35 U.S.C. 154(b) by 35 days.

(21) Appl. No.: 12/317,365

(22) Filed: Dec. 22, 2008

(65) Prior Publication Data
US 2009/0166505 A1 Jul. 2, 2009

Related U.S. Application Data

(60) Provisional application No. 61/009,760, filed on Jan. 2, 2008.

(51) Int. Cl.
*A47G 1/24* (2006.01)
*B60R 1/02* (2006.01)

(52) U.S. Cl. .................. 248/478; 248/475.1; 248/476; 248/479; 403/59; 403/61; 403/97

(58) Field of Classification Search .............. 248/475.1, 248/476, 479, 478; 403/59, 61, 97
See application file for complete search history.

(56) References Cited

U.S. PATENT DOCUMENTS

| | | | |
|---|---|---|---|
| 2,712,739 A | | 7/1955 | Dempster |
| 3,323,842 A | | 6/1967 | Hanson |
| 3,346,229 A | * | 10/1967 | Carson, Jr. ............ 248/477 |
| 3,784,149 A | * | 1/1974 | Brudy ............... 248/478 |
| 4,125,244 A | | 11/1978 | Lukey |
| 4,165,156 A | | 8/1979 | O'Connell |
| 4,186,905 A | * | 2/1980 | Brudy ............... 248/478 |
| 4,565,541 A | | 1/1986 | Obrecht |

(Continued)

FOREIGN PATENT DOCUMENTS

GB 2374578 A * 10/2002

(Continued)

OTHER PUBLICATIONS

EP 08 17 3112, Search Report, Sep. 28, 2009, MEKRA Lang GmbH & Co.

*Primary Examiner*—Anita M King
*Assistant Examiner*—Nkeisha J Smith
(74) *Attorney, Agent, or Firm*—McNair Law Firm, P.A.; Seann P. Lahey (57) ABSTRACT

A mirror assembly comprising a mounting bracket for attachment to a vehicle exterior; a first pivot plate on the mounting bracket having a concave upper surface with a series of grooves formed therein; a support arm pivotally carried on the first pivot plate of the mounting bracket; and, a second pivot plate carried by the support arm having a base surface with a plurality of protruding teeth engaging the grooves in the first pivot plate so that a pivot gap is defined between the upper surface of the first pivot plate and the base surface of second pivot plate; whereby the pivot gap allows the teeth to both pivot and slide in the grooves of the first pivot plate so that the support arm is pivotal in a multi-axis arrangement with the mounting bracket to accommodate misalignment between the mounting bracket and the support arm during installation on a vehicle.

11 Claims, 8 Drawing Sheets

U.S. PATENT DOCUMENTS

| | | | |
|---|---|---|---|
| 4,623,115 A | 11/1986 | Brester | |
| 4,668,059 A * | 5/1987 | Ohyama | 248/549 |
| 4,789,232 A * | 12/1988 | Urbanek | 248/549 |
| 5,081,546 A | 1/1992 | Bottrill | |
| 5,102,255 A | 4/1992 | Heinz | |
| 5,432,640 A | 7/1995 | Gilbert et al. | |
| 5,557,476 A | 9/1996 | Oishi | |
| 5,639,054 A | 6/1997 | Gerndt et al. | |
| 5,966,776 A * | 10/1999 | Ona | 16/328 |
| 6,024,459 A | 2/2000 | Lewis | |
| 6,286,968 B1 * | 9/2001 | Sailer et al. | 359/872 |
| 6,302,549 B1 * | 10/2001 | Branham et al. | 359/871 |
| 6,394,687 B1 * | 5/2002 | Lee | 403/96 |
| 6,464,589 B1 | 10/2002 | Shinozuka | |
| 6,517,439 B1 | 2/2003 | Sears | |
| 6,715,377 B1 | 4/2004 | Brouwer | |
| 6,789,976 B2 * | 9/2004 | Hung et al. | 403/84 |
| 6,896,436 B2 | 5/2005 | McDevitt | |
| 6,929,418 B2 | 8/2005 | McDevitt | |
| 7,036,945 B2 * | 5/2006 | Sakata | 359/841 |
| 7,048,395 B2 | 5/2006 | Lang et al. | |
| 7,137,715 B2 | 11/2006 | Schuurmans et al. | |
| 7,166,132 B2 | 1/2007 | Callaway et al. | |
| 7,207,683 B2 | 4/2007 | Lewis | |
| 7,445,191 B2 * | 11/2008 | Courbon | 248/479 |
| 7,490,945 B2 * | 2/2009 | Proctor | 359/841 |
| 7,645,044 B2 * | 1/2010 | Lee | 359/876 |
| 2009/0261226 A1 * | 10/2009 | Branham | 248/477 |

FOREIGN PATENT DOCUMENTS

WO    WO 2005/068257 A    7/2005

\* cited by examiner

MULTI-AXIS PIVOTING DETENT JOINT ASSEMBLY FOR AN EXTERIOR VEHICLE MIRROR

CROSS REFERENCE TO RELATED APPLICATION

This application claims priority from U.S. Provisional Application filed Jan. 2, 2008 under Application No. 61/009,760.

BACKGROUND OF THE INVENTION

1) Field of the Invention

The present invention relates to exterior vehicle mirror assemblies, and more particularly, to a detent joint for large commercial vehicle mirror assemblies that involves rounded cooperating surface geometries to allow for multi-axis movement to accommodate misalignment between a mounting bracket and support arm when mounted to the vehicle, while maintaining the proper detent function to hold the mirror assembly in a desired position.

2) Description of Related Art

Exterior mirror assemblies are known to include a detent connection joint between a mounting bracket attached to the vehicle and a support arm carrying the mirror head so that the mirror can be selectively positioned and held in place. However, manufacturing variances for large exterior vehicle mirror assemblies typically result in some degree of misalignment between the two detent surfaces when mounted to the vehicle. In some cases the parts are flexible enough to accommodate slight misalignment. This, however, leads to line and point contact location that create premature wear and tear on the joint. This wear will eventually cause the detent joint to loosen over time from vibration. Eventually, the joint will no longer hold the mirror in position. In other cases, the mirror assembly system will not accommodate misalignment and results in poor or limited detent performance when mounted to the vehicle.

U.S. Pat. No. 4,186,905 (Brudy) shows a truck mirror that includes a detent member with grooves and a complementary engaging member that includes spaced projections. Axial compression of a spring moves the grooves into engagement with the projections. There is no disclosure in the specification of any tolerance for misalignment in this arrangement. Movement of this detent mechanism is limited strictly to a single vertical axis.

U.S. Pat. No. 5,081,546 (Bottrill) shows a vehicle exterior mirror that includes detent formations that includes a compression spring. Misalignment is prevented by allowing a wobble in the washer connector as described in the specification at col. 3, lines 10-20. There is no disclosure of cooperating rounded surfaces on the detent mechanism to allow for multi-axis movement.

U.S. Pat. No. 7,137,715 (Schuurmans et al.) shows an external vehicle mirror that includes cooperating engaging members to form a detent arrangement, and a spring adapted to hold the detent arrangement engaged. There is no disclosure of cooperating rounded surfaces on the detent mechanism to accommodate misalignment and allow for multi-axis movement.

None of the cited patents or known prior art teach a detent joint having a rounded, and preferably partial spherical segment, surface to allow for multi-axis rotation while maintaining proper detent resistance. Thus, there is a need for improvement in the art to provide a detent joint for exterior mirror assemblies that maintains a proper detent connection while preventing uneven wear and accommodating misalignment.

Accordingly, it is an object of the present invention to provide a detent connection that will forgive misalignment between a mounting bracket and support arm.

It is a further object of the present invention to provide a detent geometry in which the engaging components are rounded in a generally spherical segment shape to allow for multi-axis movement.

SUMMARY OF THE INVENTION

The above objectives are accomplished according to the present invention by providing a spherical geometry to the detent joint between the two interacting joint parts. More particularly, the above objectives are accomplished according to the present invention by providing a mirror assembly comprising a mounting bracket for attachment to a vehicle exterior; a support arm carried by the mounting bracket for carrying a mirror head; an arm connector carried generally at a distal end of the support arm being pivotally connected to the mounting bracket; and a multi-axis pivoting detent joint interconnecting the mounting bracket and the arm connector. The detent joint includes a first pivot plate carried by the mounting bracket having a concave upper surface with a series of grooves formed therein; and, a second pivot plate carried by the arm connector having a rounded convex base surface received into a recess defined by the concave upper surface of the first pivot plate, and a plurality of rounded teeth protruding from the base surface engaging the grooves in the first pivot plate so that the base surface is spaced from the concave upper surface to form a pivot gap there between; whereby the pivot gap allows the rounded teeth to both pivot and slide in the grooves of the first pivot plate so that the arm connector is pivotal in a multi-axis arrangement with the mounting bracket to accommodate misalignment between the mounting bracket and the support arm during installation on a vehicle.

In a further embodiment, the first pivot plate includes a central opening aligned with an interior cavity of the mounting bracket to provide a continuous passage through the first pivot plate into the interior cavity.

In a further embodiment, the second pivot plate includes a complementary central opening aligned with the central opening of the first pivot plate.

In a further embodiment, the arm connector includes a connector post extending through the central opening of the first pivot plate and the second pivot plate into the interior cavity of the mounting bracket in a pivoting arrangement so that the connector post moves within the interior cavity.

In a further embodiment, the connector post includes a hollow interior channel defining a continuous passage from the arm connector to the interior cavity of the mounting bracket.

In a further embodiment, a securing rod is disposed in the hollow interior channel of the arm connector interconnecting the arm connector to the mounting bracket. The securing rod is spring biased to direct the first pivot plate against the second pivot plate to maintain proper resistance of the detent joint to prevent unwanted movement of the support arm.

In a further embodiment, the concave upper surface and the convex base surface each have a radius of curvature comprising a spherical segment.

In a further embodiment, the base surface includes a radius of curvature complementary to the radius of curvature of the concave upper surface so that the pivot gap is maintained between the base surface and the concave upper surface during pivotal movement of the arm connector on the mounting bracket.

In a further embodiment, the pivot gap allows for a pivotal movement of at least +/− 2° between the arm connector and the mounting bracket.

In a further embodiment, the rounded teeth include a metal coating to harden and enhance the durability of the teeth.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
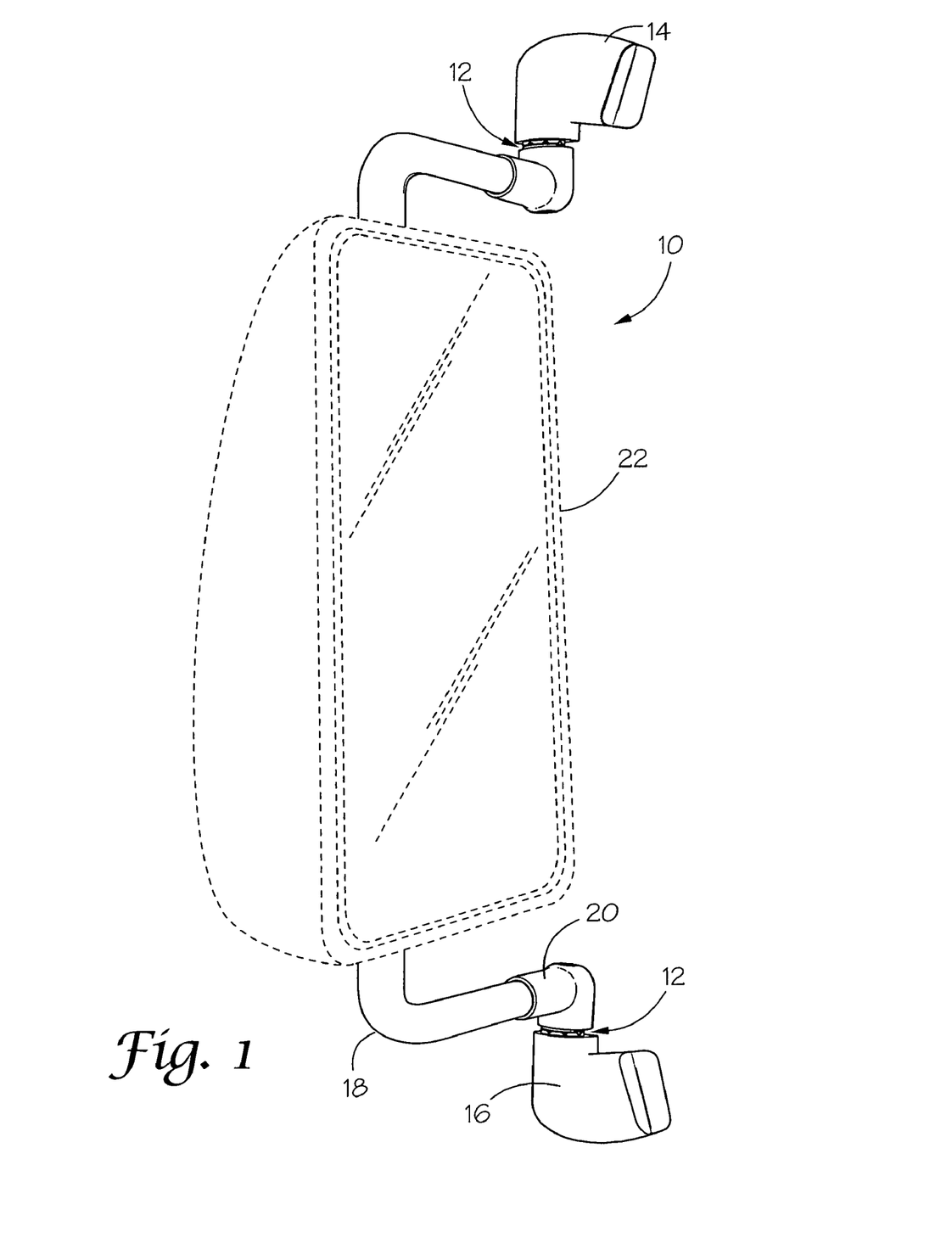
FIG. 1 shows a perspective view of a mirror assembly for mounting to a vehicle exterior having a multi-axis pivoting detent joint according to the present invention.
Figure 2:
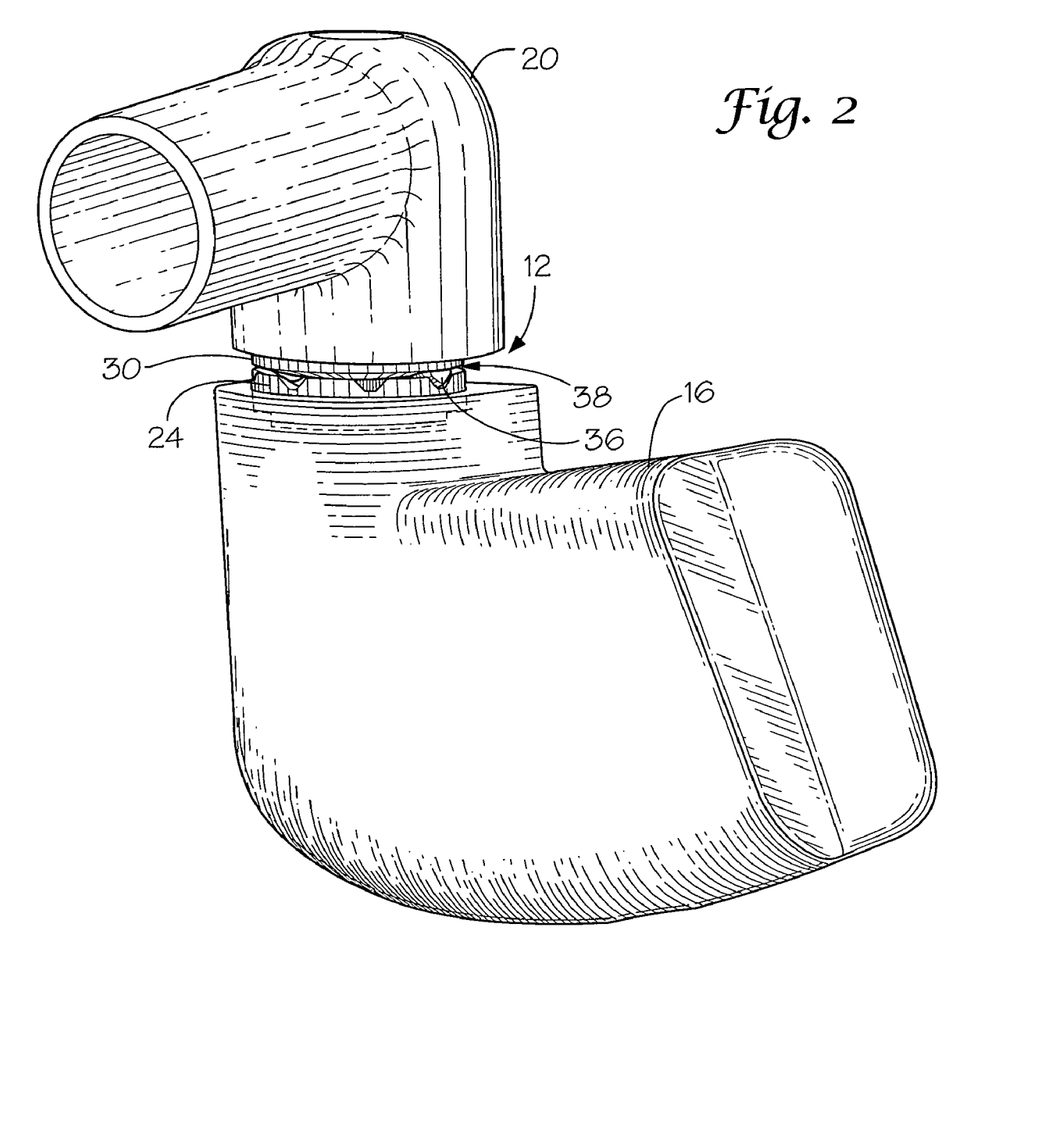
FIG. 2 shows a detailed perspective view of a detent joint according to the present invention.

With reference to the drawings, the invention will now be described in more detail. Referring to FIGS. 1 and 2, an external vehicle mirror assembly, designated generally as 10, is shown which includes a multi-axis pivoting detent joint, designated generally as 12, on both an upper mounting bracket 14 and lower mounting bracket 16. Mounting brackets 14 and 16 are generally identical and the following detailed description in regard to mounting bracket 16 applies equally to mounting bracket 14. Further, while the illustrated embodiment shows both an upper and lower mounting bracket 14 and 16, it is understood that various alternative mirror assembly designs that hang from a single upper mounting bracket or rest on a single lower mounting bracket are considered within the spirit and scope of the present invention. Incorporating both an upper and lower mounting bracket may not be required for practicing the present invention and is dependent upon the qualified design for a given vehicle.

Mounting bracket 16 is adapted for attachment to a vehicle exterior. A support arm 18 is attached to mounting bracket 16. In the illustrated embodiment, the connection of support arm 18 to mounting bracket 16 is accomplished by providing an arm connector 20, which interconnects mounting bracket 16 and support arm 18 in a multi-axis pivotal cooperation as described herein below. Support arm 18 is secured to arm connector 20 using any of various methods well-known to those skilled in the art, such as through bolting, screwing, gluing or friction fit. Alternatively, arm connector 20 and its elements, such as connector post 46 as detailed herein, can be a molded end of support arm 18 as opposed to a separate component. Preferably, arm connector 20 is spring biased against mounting bracket 16 to provide resistance for detent joint 12 to hold mirror head 22 and support arm 18 in a desired position. Disposed between mounting bracket 16 and arm connector 20 is detent joint 12 having rounded cooperating surface geometries to allow for multi-axis pivoting. This arrangement allows arm connector 20, and thus support arm 18, to pivot in a multi-axis arrangement on mounting bracket 16 to accommodate misalignment during installation on the vehicle.

Figure 3A:
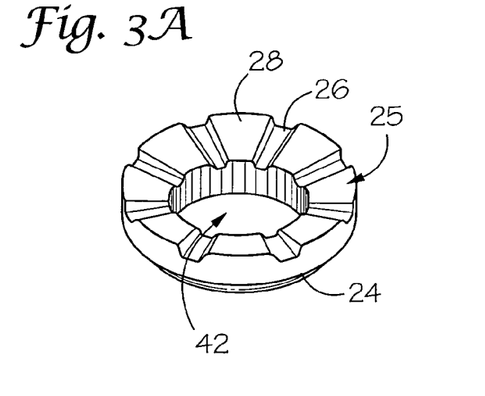
FIGS. 3A-3C show perspective views of several embodiments of the first pivot plate according to the present invention.
Figure 5:
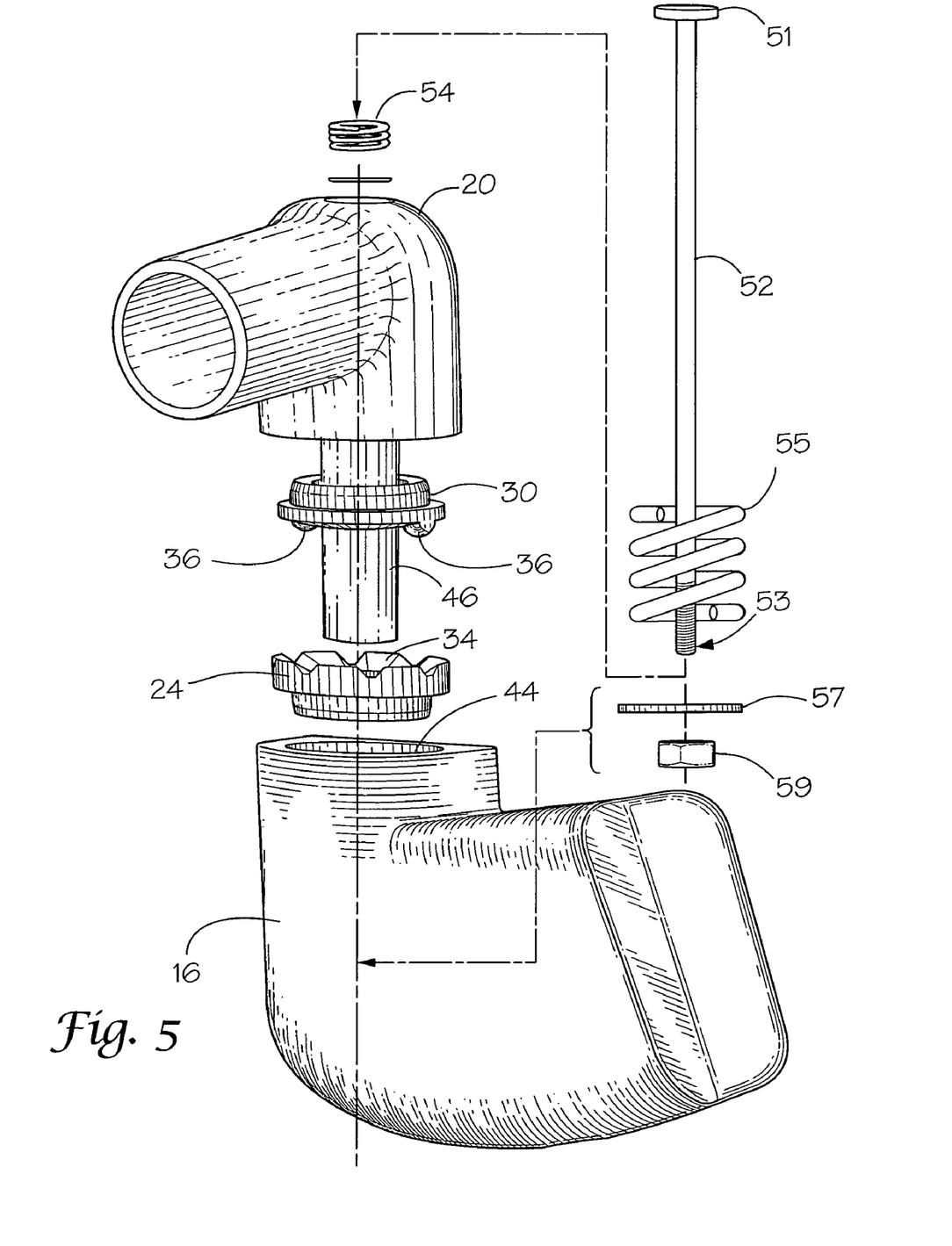
FIG. 5 shows an exploded perspective view of the detent joint according to the present invention.
Figure 6:
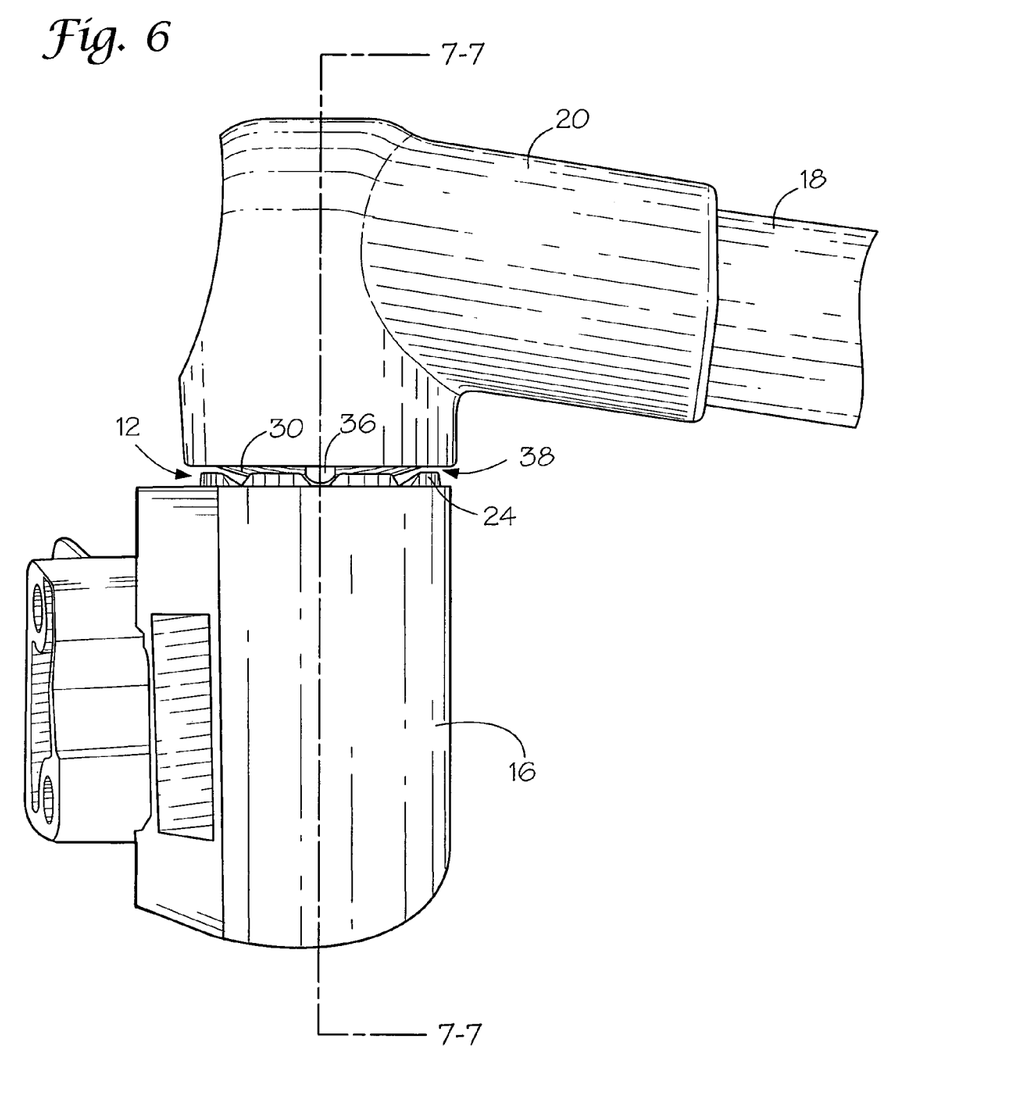
FIG. 6 shows a side elevation view of the detent joint according to the present invention.

Referring to FIGS. 2, 5 and 6, detent joint 12 includes a first pivot plate 24 carried by mounting bracket 16. First pivot plate 24 is fixed to mounting bracket 16 to resist rotation on mounting bracket 16 to provide a first half of detent joint 12. Further referring to FIGS. 3A and 3C, first pivot plate 24 includes an upper surface, designated generally as 25, having a concave shape. A series of grooves 26 are defined into upper surface 25. Referring to FIG. 3C, in a preferred embodiment grooves 26 are curved to follow the same radius of curvature as upper surface 25. Alternatively, however, as shown in FIG. 3A, grooves 26 may be formed in a generally straight configuration. Grooves 26 essentially segment upper surface 25 into a series of ridges 28, which together with grooves 26 provide a first half of the detent function to detent joint 12. In a preferred embodiment, the concave shape of upper surface 25 is a spherical segment in that the radius of curvature is such that if extended would form a sphere. Accordingly, while the concave shape of upper surface 25 is only a spherical segment, it is spherical in radius of curvature to provide a rounded uniform engaging surface across first pivot plate 24. Alternatively, a non-spherical radius of curvatures may be used but is not the preferred embodiment as such a surface on first pivot plate 24 can result in uneven wear and possible premature joint failure due to the uneven application of forces.

Figure 4A:
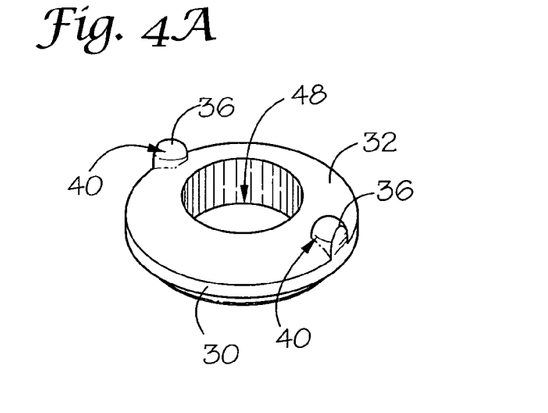
FIGS. 4A-4B show perspective views of several embodiments of the second pivot plate according to the present invention.
Figure 8A:
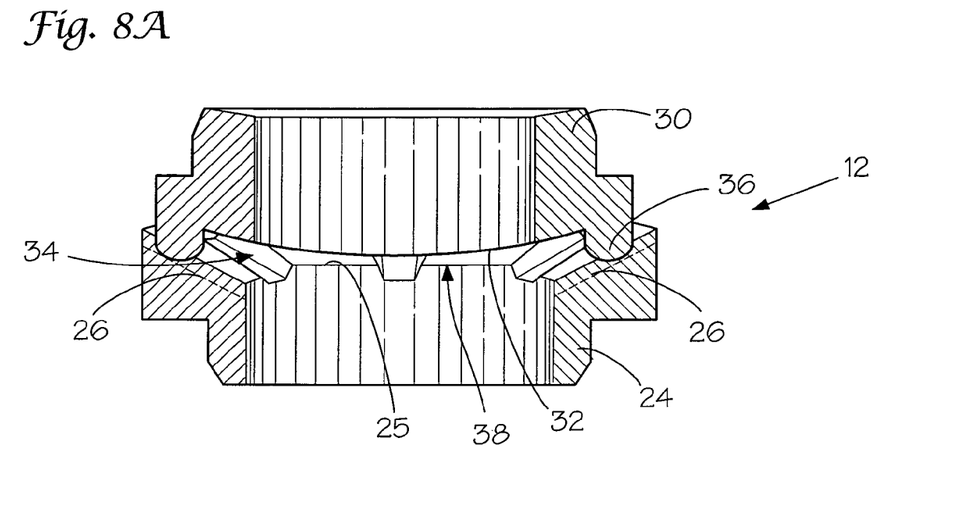

Further referring to FIGS. 4A and 8A, the other half of detent joint 12 includes a second pivot plate 30 carried by arm connector 20 that includes a convex rounded base surface 32 complementary to the concave shape of first pivot plate 24. Convex rounded base surface 32 is received into a recess 34 defined by concave upper surface 25 of first pivot plate 24. Second pivot plate 30 includes a plurality of rounded teeth 36 protruding from the convex shaped base surface 32 engaging in a complimentary fashion with grooves 26 of first pivot plate 24 so that base surface 32 is spaced from concave upper surface 25 to form a pivot gap 38 (FIG. 6) there between. Pivot gap 38 allows rounded teeth 36 to both pivot and slide in grooves 26 of first pivot plate 24 so that arm connector 20 is pivotal in a multi-axis arrangement with mounting bracket 16 to accommodate misalignment between mounting bracket 16 and support arm 18 during installation on a vehicle. In a preferred embodiment, base surface 32 includes a radius of curvature complementary to the radius of curvature of concave upper surface 25, which is preferably spherical, so that pivot gap 38 is maintained between base surface 32 and concave upper surface 25 during pivotal movement of arm connector 20 on mounting bracket 16. Pivot gap 38 provided by rounded teeth 36 prevents base surface 32 from engagement with upper surface 25 of first pivot plate 24. Preferably, pivot gap 38 allows second pivot plate 30 to pivot in any direction approximately +/−5°.

Preferably, rounded teeth 36 are rounded to conform to grooves 26 in first pivot plate 24. This allows teeth 36 to easily slide laterally within grooves 26 to accommodate pivoting along a first axis. Further, rounded teeth 36 also allow second pivot plate 30 to easily pivot within a groove, for example in a fore and aft direction within the grooves, to accommodate pivoting along a second axis. The engagement of teeth 36 with grooves 26 creates the typical detent function between first pivot plate 24 and second pivot plate 30 when the mechanism is spring loaded to create a bias tension between mounting bracket 16 and arm connector 20. To increase durability, rounded teeth 36 may include a metal coating, designated generally as 40 in FIG. 3, or metal impregnation to harden and enhance the engaging surface with first pivot plate 24.

Figure 3B:
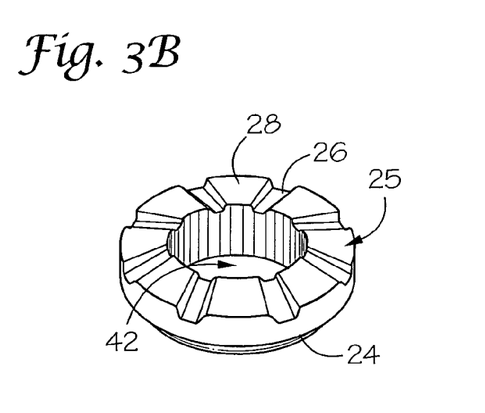
Figure 3C:
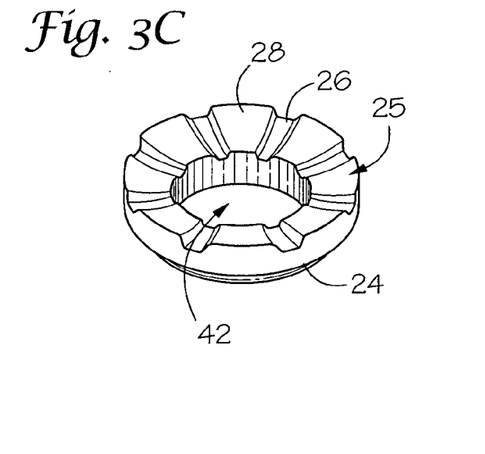
Figure 4B:
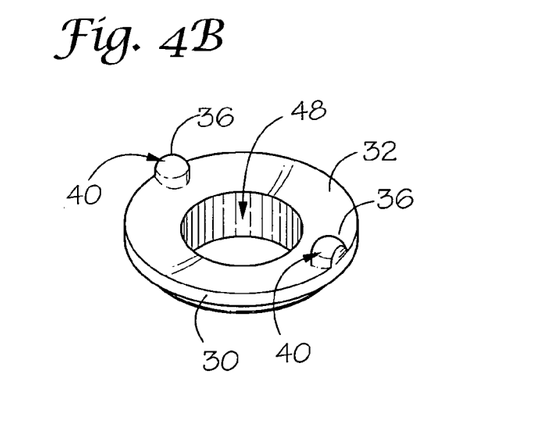
Figure 8B:
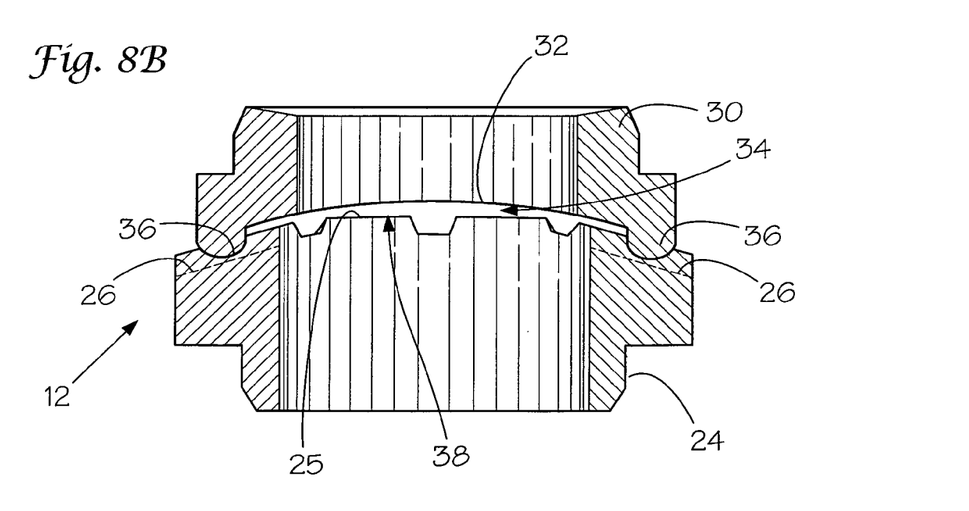

Referring to FIGS. 3B, 4B, and 8B, an alternative arrangement is illustrated for detent joint 12 in which the surface geometries of first pivot plate 24 and second pivot plate 30 are reversed. In this embodiment, first pivot plate 24 is formed with a convex upper surface 25 into which grooves 26 are formed. Second pivot plate 30 is then formed with a concave base surface 32 that forms a recess 34 for receiving convex upper surface 25 of first pivot plate 24. The resulting cooperation between the pivot plates is thus generally the same as outline above and a multi-axis pivoting detent joint is provided that maintains the same pivot gap 38.

Figure 7A:
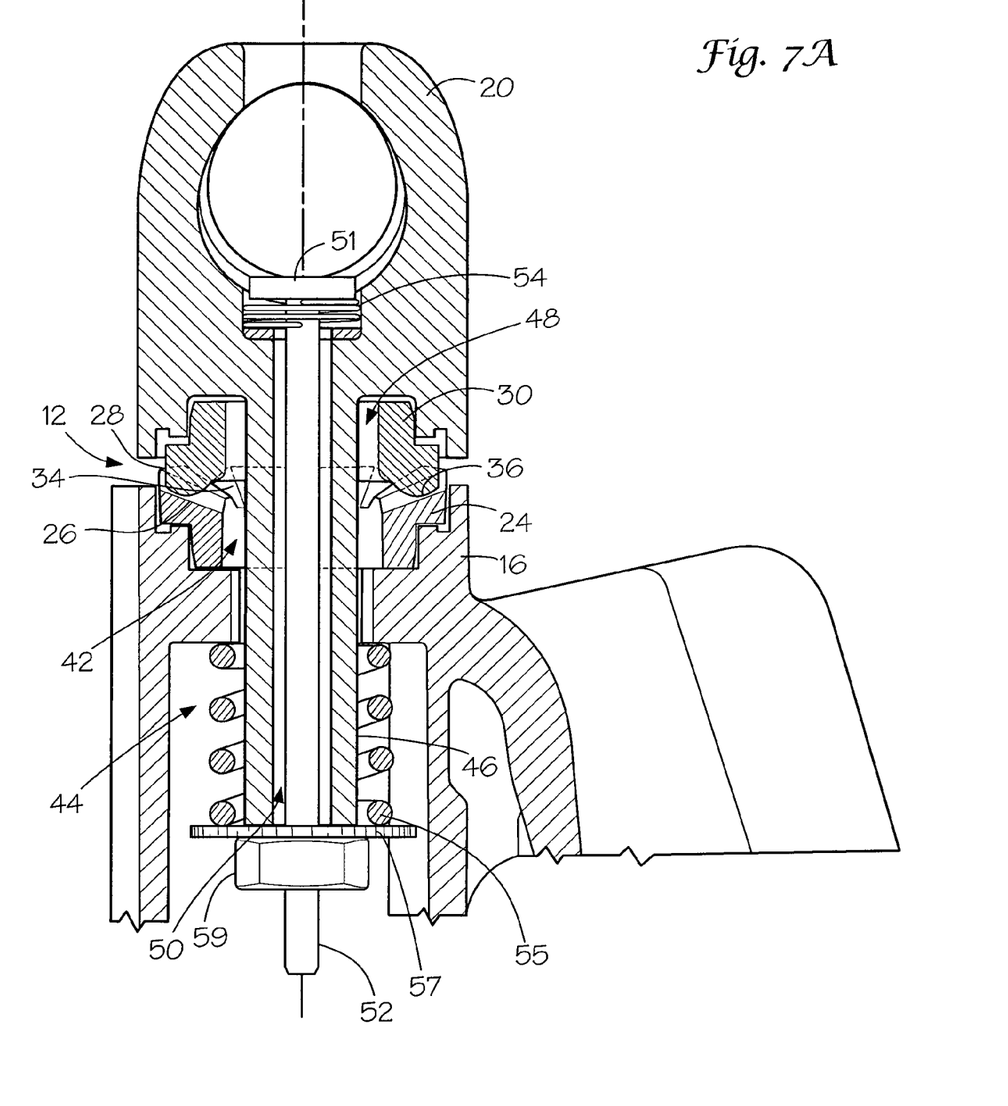
FIG. 7A shows a cross-section view of the detent joint in FIG. 6 according to the present invention.
Figure 7B:
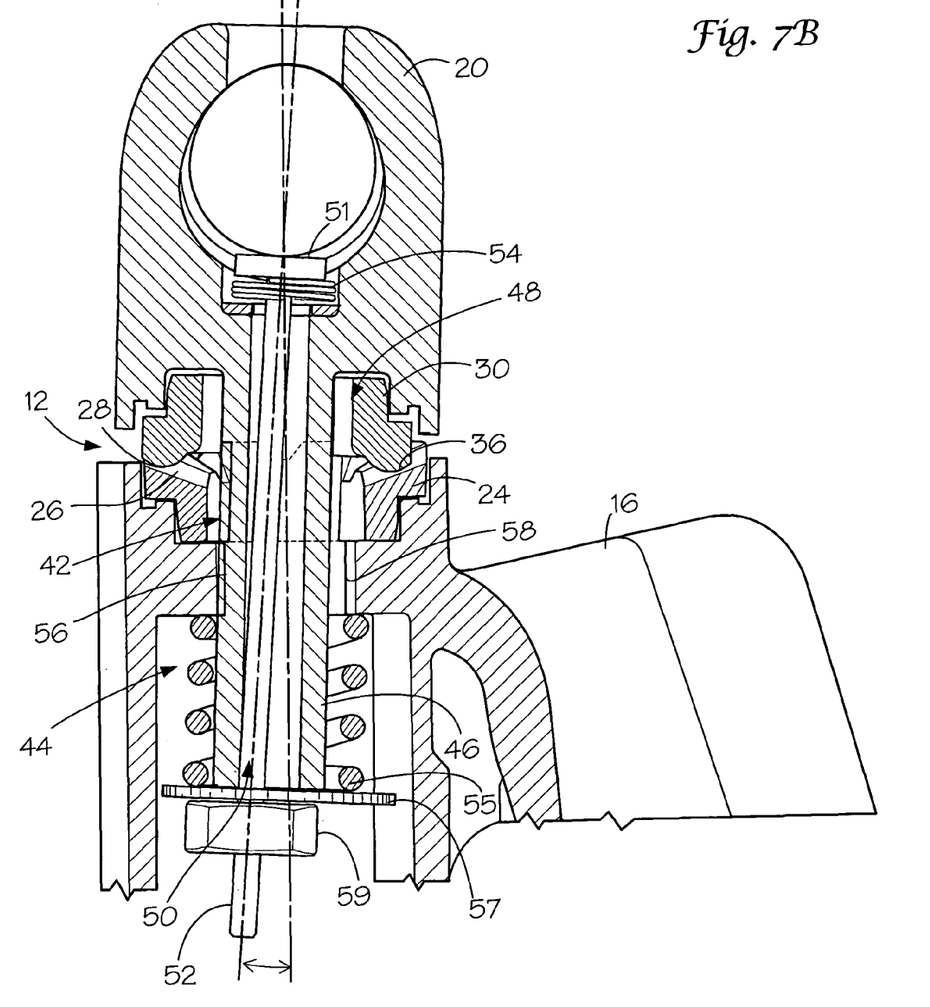
FIG. 7B shows a cross-section view of the detent joint in FIG. 7A in an angled orientation according to the present invention; and, FIGS. 8A-8B show cross-section views of alternative embodiments of the pivot plates according to the present invention.

Referring further to FIGS. 5, 7A and 7B, in the illustrated embodiment a central opening 42 is provided in first pivot plate 24. Central opening 42 is aligned with an interior cavity 44 of mounting bracket 16 to provide a continuous passage through first pivot plate 24 into interior cavity 44. Arm connector 20 includes a connector post 46 extending outward from arm connector 20. Second pivot plate 30 includes a complementary central opening 48 receiving connector post 46, which then extends through central opening 42 of first pivot plate 24 and into interior cavity 44 of mounting bracket 16 in a pivoting arrangement so that connector post 46 moves within interior cavity 44. Connector post 46 includes a hollow interior channel, designated generally as 50, defining a continuous passage from arm connector 20 to interior cavity 44 of mounting bracket 16. A securing rod 52 is disposed in hollow interior channel 50 interconnecting arm connector 20 to mounting bracket 16. Securing rod 52 is spring biased to compress arm connector 20 and mounting bracket 16 together. Preferably, a pair of bias springs 54 and 55 are disposed at opposite distal ends of securing rod 52. In the illustrated embodiment, spring 54 is secured to arm connector 20 by bolt head 51. Washer 57 is bolted to second distal end 53 by nut 59 to secure spring 55 around connector post 46 in interior cavity 44 of mounting bracket 16. The spring bias on securing rod 52 directs arm connector 20 against mounting bracket 16 to force first and second pivot plates together to provide sufficient resistant for detent joint 12. Referring to FIG. 7B, when arm connector 20 is moved to a maximum allowable pivot range, connector post 46 contacts a side wall 56 of interior cavity 44 in mounting bracket 16 to prevent further movement. By adjusting the gap between side walls 56 and 58 in interior cavity 44, the extent to which arm connector 20 pivots can be controlled. Most preferably, the pivot range between arm connector 20 and mounting bracket 16 is limited to +/−2° to avoid unintended play in the mirror assembly.

In summary, the detent function is provided by the spherical geometry of first pivot plate 24 and teeth 36 of second pivot plate 30. In the illustrated embodiment, one half of detent joint 12 is one of a concave or convex shaped plate which includes a series of grooves and ridges. The other half of the joint comprised the other of a convex or concave shaped plate with a plurality of teeth for engaging the grooves in a complimentary arrangement. The contact between the components creates the typical detent function when the mechanism is spring loaded. However, a pivot gap 38 between the two pivot plates 24 and 30 of detent joint 12 allows for misalignment forgiveness by pivoting arm connector 20 in a multi-axis arrangement on mounting bracket 16.

While a preferred embodiment of the invention has been described using specific terms, such description is for illustrative purposes only, and it is to be understood that changes and variations may be made without departing from the spirit or scope of the following claims.

What is claimed is:

1. An exterior vehicle mirror assembly having a pivoting detent joint, said mirror assembly comprising:
    a mounting bracket for attachment to a vehicle exterior;
    a support arm carried by said mounting bracket for carrying a mirror head;
    an arm connector carried generally at a distal end of said support arm being pivotally connected to said mounting bracket;
    a multi-axis pivoting detent joint interconnecting said mounting bracket and said arm connector, said detent joint including:
        a first pivot plate carried by said mounting bracket having a concave upper surface with a series of grooves formed therein;
        a second pivot plate carried by said arm connector having a rounded convex base surface received into a recess defined by said concave upper surface of said first pivot plate, and a plurality of rounded teeth protruding from said base surface engaging said grooves in said first pivot plate so that said base surface is spaced from said concave upper surface to form a pivot gap there between;
        a central opening included in said first pivot plate aligned with an interior cavity of said mounting bracket to provide a continuous passage through said first pivot plate into said interior cavity;
        a complementary central opening included in said second pivot plate aligned with said central opening of said first pivot plate;
        a connector post included on said arm connector extending through said central opening of said first pivot plate and said second pivot plate into said interior cavity of said mounting bracket in a pivoting arrangement so that said connector post moves within said interior cavity; and,
        a hollow interior channel included in said connector post defining a continuous passage from said arm connector to said interior cavity of said mounting bracket;
    whereby said pivot gap allows said rounded teeth to both pivot and slide in said grooves of said first pivot plate so that said arm connector is pivotal in a multi-axis arrangement with said mounting bracket to accommodate misalignment between said mounting bracket and said support arm during installation on a vehicle.

2. The assembly of claim 1 including a securing rod disposed in said hollow interior channel of said arm connector interconnecting said arm connector to said mounting bracket.

3. The assembly of claim 2 wherein said securing rod is spring biased to direct said first pivot plate against said second pivot plate to maintain proper resistance of said detent joint to prevent unwanted movement of said support arm.

4. The assembly of claim 1 wherein said concave upper surface and said convex base surface each have a radius of curvature comprising a spherical segment.

5. The assembly of claim 1 wherein said base surface includes a radius of curvature complementary to said radius of curvature of said concave upper surface so that said pivot gap is maintained between said base surface and said concave upper surface during pivotal movement of said arm connector on said mounting bracket.

6. The assembly of claim 1 wherein said pivot gap allows for a pivotal movement of at least +/−2° between said arm connector and said mounting bracket.

7. The assembly of claim 1 wherein said rounded teeth include a metal coating to harden and enhance the durability of said teeth.

8. A multi-axis pivoting detent joint assembly for an exterior vehicle mirror comprising:

a mounting bracket for attachment to a vehicle exterior;

a first pivot plate included in said mounting bracket having a concave upper surface with a series of grooves formed therein;

a support arm pivotally carried on said first pivot plate of said mounting bracket;

a second pivot plate carried by said support arm having a base surface with a plurality of protruding teeth engaging said grooves in said first pivot plate so that a pivot gap is defined between said upper surface of said first pivot plate and said base surface of second pivot plate;

a central opening included in said first pivot plate aligned with an interior cavity of said mounting bracket to provide a continuous passage through said first pivot plate into said interior cavity;

a connector post included on said support arm extending through said central opening of said first pivot plate and into said interior cavity of said mounting bracket in a pivoting arrangement so that said connector post moves within said interior cavity; and, a hollow interior channel included in said connector post defining a continuous passage generally from said support arm to said interior cavity of said mounting bracket;

whereby said pivot gap allows said teeth to both pivot and slide in said grooves of said first pivot plate so that said support arm is pivotal in a multi-axis arrangement with said mounting bracket to accommodate misalignment between said mounting bracket and said support arm during installation on a vehicle.

9. The assembly of claim 8 wherein said grooves are curved to follow the same radius of curvature as said concave upper surface.

10. The assembly of claim 8 wherein said base surface has a convex shape and is received into a recess defined by said concave upper surface of said first pivot plate.

11. The assembly of claim 8 including a securing rod disposed in said hollow interior channel being spring biased to direct said first pivot plate against said second pivot plate to maintain proper resistance of said detent joint to prevent unwanted movement of said support arm.

* * * * *